US012728791B2

(12) United States Patent
Edwards

(10) Patent No.: US 12,728,791 B2
(45) Date of Patent: Sep. 8, 2026

(54) SAFETY DEVICE

(71) Applicant: Be Seen Screen Limited, Newport Pagnell (GB)

(72) Inventor: Richard Edwards, Marston Moretaine (GB)

( * ) Notice: Subject to any disclaimer, the term of this patent is extended or adjusted under 35 U.S.C. 154(b) by 0 days.

(21) Appl. No.: 17/433,383

(22) PCT Filed: Feb. 25, 2019

(86) PCT No.: PCT/GB2019/050509

§ 371 (c)(1),
(2) Date: Aug. 24, 2021

(87) PCT Pub. No.: WO2020/174203

PCT Pub. Date: Sep. 3, 2020

(65) Prior Publication Data

US 2022/0144162 A1 May 12, 2022

(51) Int. Cl.
*B60Q 1/30* (2006.01)
*B60Q 1/26* (2006.01)
*B60Q 1/52* (2006.01)

(52) U.S. Cl.
CPC ................. *B60Q 1/30* (2013.01); *B60Q 1/26* (2013.01); *B60Q 1/2661* (2013.01); *B60Q 1/302* (2013.01); *B60Q 1/52* (2013.01)

(58) Field of Classification Search
CPC .......... G08G 1/16; G08G 1/166; G09F 13/22; G06Q 30/00; G06Q 30/02; H02S 40/38; B60Q 1/26; B60Q 1/2661; B60Q 1/30; B60Q 1/50; B60Q 1/52; B32B 27/08; B23B 27/40; H01Q 5/15; H01Q 9/42; F21V 7/04; F21V 8/00; F21V 23/00; F21K 9/232; F21K 9/61
See application file for complete search history.

(56) References Cited

U.S. PATENT DOCUMENTS 10,036,847 B2 * 7/2018 Nichol ................. G02B 6/0043
2003/0104214 A1 * 6/2003 Tezuna ....................... C09J 5/02 428/422.8
2004/0226601 A1 * 11/2004 Banister .................. H02S 40/38 136/252
2006/0230654 A1 * 10/2006 Dome .................. G09F 21/026 40/329
2012/0188642 A1 * 7/2012 Cejka .................. B60Q 1/2615 359/549
2015/0043231 A1 * 2/2015 Clark ...................... F21S 43/00 362/485
2017/0200197 A1 * 7/2017 Brubaker ........... G06Q 30/0241
2017/0205572 A1 * 7/2017 Nichol ...................... F21K 9/65
2019/0299577 A1 * 10/2019 Hill ........................... B32B 3/30
2021/0170728 A1 * 6/2021 Gerken ................ B32B 27/283

OTHER PUBLICATIONS

NPL search (Feb. 17, 2023).*

* cited by examiner

Primary Examiner — Van T Trieu

(57) ABSTRACT

A safety device (2) for a motor vehicle (4) comprising a surface (6) of or mounted to the motor vehicle (4), which surface is arranged to transmit a warning signal towards oncoming other vehicles.

5 Claims, 3 Drawing Sheets

Figure 1:
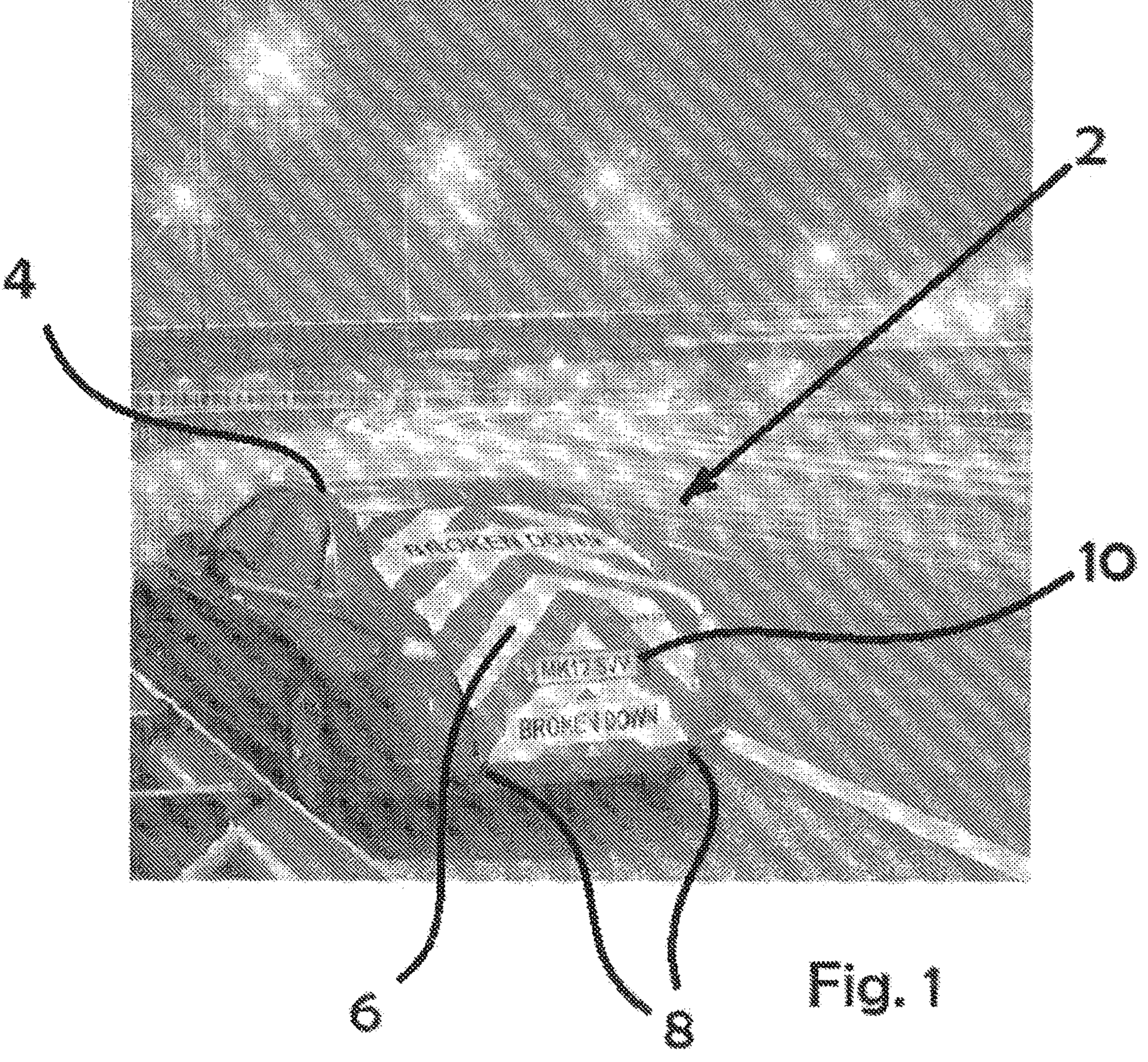

14
16
2
4
14

SAFETY DEVICE

CROSS-REFERENCES TO RELATED APPLICATIONS

This invention relates to a safety device and, in particular, to a safety device to be used in relation a motor vehicle.

BACKGROUND OF THE INVENTION

For many years, several types of motor vehicle have been supplied with a warning triangle at the point of manufacture and for use in the event of a break-down on a road. Such warning triangles are used as a warning to other road users of an up-coming hazard on the road ahead. The major problem with these warning triangles is that they do not give enough of a warning distance between a stricken motor vehicle and the on-coming road user. In harsh weather conditions and/or when visibility is reduced, the situation is even worse where the warning triangle would not be seen more than about 90-100 metres away from its location, which is not a large distance when travelling at speed and thus there is little reaction time available to make any necessary driving changes.

The United Kingdom Highway Code states that in the event of a breakdown on a carriageway one should put a warning triangle on the road at least 45 metres behind the broken-down vehicle on the same side of the road. This requires a person to walk that distance along the edge of often busy roads with fast-moving traffic to place the triangle and this can lead to potentially fatal incidents, particularly in poor weather conditions and/or poor visibility conditions. The Highway Code also states that in some circumstances, such as on a motorway, it is not recommended to use a warning triangle as it is too dangerous to place it on the hard shoulder and they cause an obstruction to emergency services and/or break-down service vehicles approaching the broken-down vehicle along the hard shoulder.

Another problem is that once placed on the side of the road, the warning triangles can get knocked or blown over and thus not be visible to on-coming drivers at all.

BRIEF SUMMARY OF THE INVENTION

According to a first aspect of the present invention, there is provided a safety device for a motor vehicle comprising a surface of or mounted to the motor vehicle, which surface is arranged to transmit a warning signal towards oncoming other vehicles.

According to a second aspect of the present invention, there is provided a method of transmitting a warning signal to motor vehicles from a stricken motor vehicle comprising providing a safety device in the form of a surface of or mounted to the stricken motor vehicle, which surface transmits the warning signal towards the oncoming other vehicles.

Owing to these aspects, a surface of or a surface mounted to a stricken motor vehicle can display a clear warning signal clearly visible to oncoming vehicles, so that drivers of oncoming vehicles can make adjustments in good time before they reach the stricken vehicle.

Advantageously, the transmitting of the warning signal can be by way of emitting light from the surface, the light provided by light-emitting devices associated with the surface, or it could be by way of reflection of light from the surface.

According to a third aspect of the present invention, there is provided a safety device for a motor vehicle comprising a sheet of flexible material detachably connectable to a portion of a motor vehicle by way of attachment means, the sheet material having an outer surface which is at least partially reflective.

Owing to this aspect, a very clear and simple safety device can be provided with any motor vehicle.

Advantageously, the outer surface of the material safety device has a chevron-style pattern in heavily contrasting colours with the possibility of other warning text and/or patterns printed thereon.

Such safety devices are extremely visible, even in poor weather conditions and/or poor visibility conditions up to around 650 metres away.

In one embodiment, a sheet material surface is detachably connectable to a rear portion of the vehicle, although the sheet material could also be detachably connected to the front portion of the vehicle. The sheet material preferably covers a major part of the portion of the vehicle to which it is connectable. The sheet material may be further arranged so as not to cover one or more light arrangements of the motor vehicle.

In order that the present invention can be clearly and completely disclosed, reference will now be made, by way of example only, to the accompanying drawings in which:

DRAWINGS

Figures 2, 3:
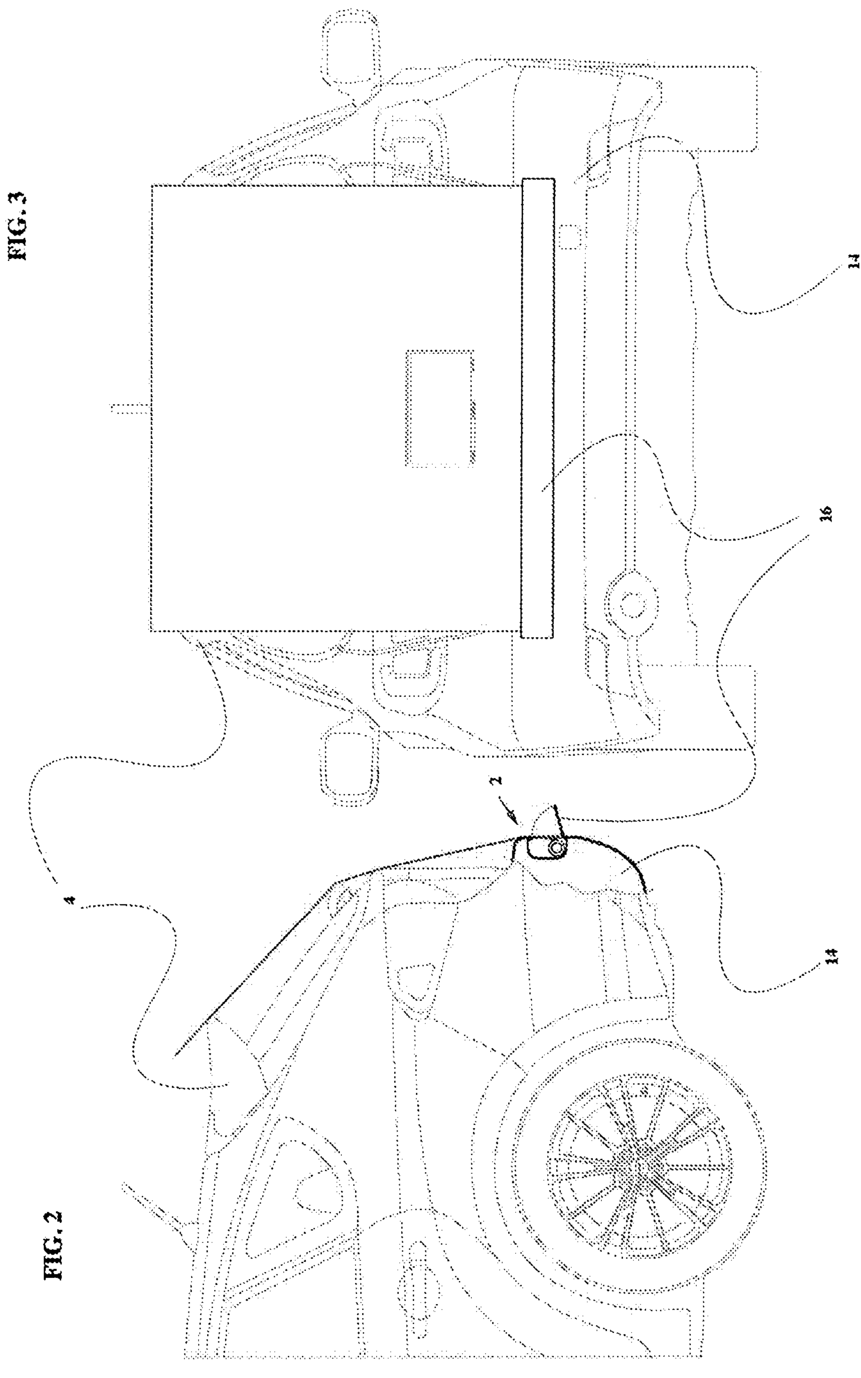
Figure 4:
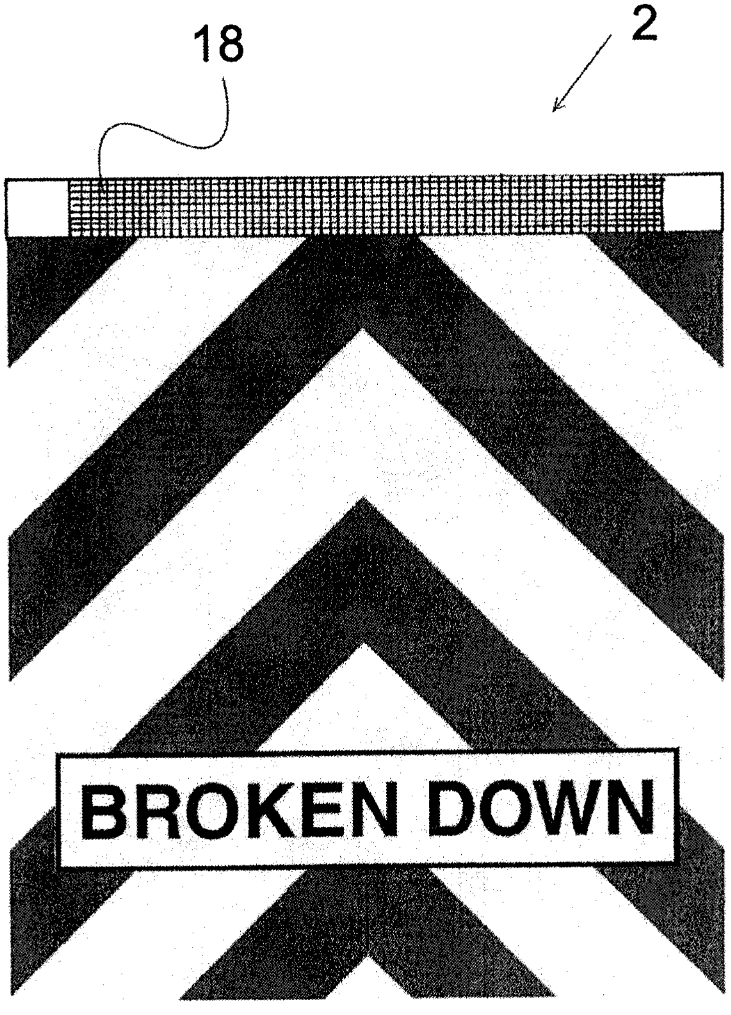

FIG. 1 shows a broken-down vehicle on the side of a road with a safety device deployed, FIGS. 2 and 3 show respective elevational views of a motor vehicle with a particular embodiment of the safety device, and FIG. 4 shows an alternative version of the safety device.

DETAILED DESCRIPTION OF THE INVENTION

Referring to FIG. 1, the safety device 2 includes a sheet of flexible material, preferably a plastics sheet material, detachably connectable to a rear portion of a motor vehicle 4 which is stricken by having broken down at the side of a road, the device 2 having a chevron-style pattern on an outer surface 6 thereof in heavily contrasting fluorescent colours, for example, yellow and red for improved visibility in daytime, twilight, and inclement weather. The outer surface 6 is at least partially reflective by application of a reflective material and shaped so as not to cover rear light arrangements of the motor vehicle. The outer surface 6 may have only part of it which includes a reflective material attached, such that, for example, only one of the contrasting colours of the chevron-style pattern comprises the reflective material or the sheet material may be completely covered in the reflective material. The sheet material is preferably a nylon reinforced polyvinyl chloride (PVC) upon which a printed micro-prismatic reflective material is attached, advantageously by high frequency welding. A suitable reflective material is 3M Diamond Grade (Registered Trade Marks) reflective sheeting.

The reflective material ensures the maximum amount of light is returned to an approaching driver and is designed for all traffic situations including motorways and urban environments. Furthermore, the material performs exceptionally well at all reasonable distances and in all weather conditions.

The device 2 is thus highly visible and serves as a warning signal, even in visually complex nighttime roadway environments.

The sheet material may be shaped not only to partially cover rear light arrangements of the motor vehicle but also, as shown, to cover the major part of the rear portion of the vehicle 4.

The outer surface 6 may also be provided with text and/or other adornments thereon, the words "BROKEN DOWN" being shown in the drawing. The device 2 is clearly visible owing to the presence of the reflective material which will reflect light originating from on-coming headlights of other vehicles. The device 2 can be seen at around 650 metres from the broken-down vehicle if the road layout allows, even in poor weather and/or poor visibility conditions.

The device 2, owing to its detachable nature, can be suited to all types of motor vehicles.

The device 2 is attached to the motor vehicle 4 by way of suitable attachment means 8. The attachment means may take several suitable forms. For example, a bottom edge region of the device 2 may be provided with elasticated or otherwise adjustable straps bonded to or looped through eyelets in the sheet material and provided with securing means in the form of, for example, fixing hooks to secure under the rear bumper of the vehicle. The top edge region of the device 2 may also be provided with elasticated or otherwise adjustable straps provided with securing means to secure onto fixings of the vehicle, such as a roof rack or roof bars, provided on many vehicles. Such straps can also be fed through windows of the vehicle which can then be closed to trap the straps and the securing means can then further be hooked or otherwise secured onto a dedicated fixing inside the vehicle or any other suitable item. Inversely, strap reels within housings could be located within the vehicle at suitable locations, the straps being provided with the securing means and pulled out of the reel housings so that the securing means may be secured to the sheet material by way of loops or eyelets on the sheet material.

Alternatively, the attachment means (for the top edge and/or bottom edge regions of the device 2) may take the form of suitable suction cups for attaching to an external surface of the motor vehicle.

As an alternative to hooks as the securing means, spring-loaded grabs of plastics material could be provided on the elasticated or otherwise adjustable straps to grip on to dedicated fixings of the vehicle or otherwise any convenient item. Advantageously, such grabs could be secured with the vehicle doors and/or boot or trunk in an open or closed position.

The sheet material of the device 2 may be provided as a simple sheet, foldable/rollable and stored in a suitable storage bag to protect the device 2. Alternatively, the device could be provided in a retractable form comprising a housing surrounding a tube around which the sheet material is wound with a ratchet and spring arrangement, similar to a roller-blind. A pull-tab on the bottom of the sheet material may provide easy manipulation of the device 2 from the housing. In this form, the device 2 could be manually operable or motorized and operated electronically.

If the device 2 is provided in such a retractable form, it is advantageous to provide the device 2 as an internal fixing in the motor vehicle. For example, with a boot or trunk open the device could be rolled out from its housing located in the region of one end of the open boot or trunk across the gap presented by the open boot or trunk and preferably fixed in the region of an opposite side of the gap by way of the pull-tab or separate sheet-retaining means also provided as an internal fixing in the motor vehicle.

The sheet material includes an opening 10 to display the registration plate number of the vehicle, which would assist break-down service providers and/or emergency services.

The side edges of the sheet material are, preferably, shaped to avoid covering some or all of rear light arrangements of the vehicle to be able to see the electrical hazard warning lights and side lights, if operable.

Furthermore, the sheet material may include re-chargeable lights attached to the outer surface 6 for illumination, which could be arranged in a convenient pattern (such as an arrow pointing to the road side of the vehicle) and possibly made to flash on and off to better alert on-coming traffic.

In use, in the event of a vehicle break-down on a road, the driver can put the hazard lights of the vehicle on if operable, put the side lights of the vehicle on, again, if operable, inform a break-down service and/or the emergency services if required and deploy the safety device 2 and attach it to the appropriate portion of the vehicle. Any passengers should exit the vehicle to a safe location off the carriageway. This sequence does not require the driver or other passenger to walk a distance down the road behind the vehicle to place a warning triangle, as would be the case without the safety device 2.

The device 2 serves as a clearly visible sign of a hazard and can be seen from a relatively large distance away so that drivers of on-coming vehicles have plenty of time to make the necessary adjustments in their driving when approaching and passing the hazard. In addition, the device is attached to the vehicle itself such that the danger to life of placing a warning triangle a distance from the vehicle is removed.

Referring to FIGS. 2 and 3, and where the device 2 is provided in such a retractable form as described above, the device 2 may be mounted to the exterior of the rear of the vehicle 4 in a dedicated compartment 12. In the embodiment shown, the device 2 is mounted in the region of the rear bumper section 14 behind an obturating panel 16 that, advantageously, blends in with the remainder of the rear bumper section 14.

Preferably, the obturating panel 16 is hinged along one edge (as shown) to allow a pivoting movement of the panel 16 to allow access to the device 2 located behind the panel. The sheet material of the device 2 (shown with no markings for convenience sake) could, as mentioned above, be provided in a retractable form comprising a housing on order to protect the sheet material, which housing may surround a tube around which the material is wound. There may also be a ratchet and spring arrangement, similar to a roller-blind. A pull-tab may provide easy manipulation of the material from the housing. In this form, the device 2 could be manually operable or motorized and operated electronically. The leading edge of the material may be attached the vehicle by any suitable means as hereinbefore described and, as shown, there may be an opening to display the registration plate of the vehicle.

Referring to FIG. 4, in order to withstand windy conditions, the sheet material may comprise portions 18 which comprise perforations in the sheet material or comprise portions of a perforated mesh material to allow air flow through the sheet material. Fixings under tension from windy conditions have the potential to cause damage and reducing that tension with perforations or perforated material portions 18 reduces the likelihood of damage to the vehicle 4. The perforations in the sheet material may be in the form of slits that allow air flow through the sheet material.

The safety device 2 is particularly useful for older drivers to notice. Older drivers have proven slower response times and decreased visual acuity at night. The sheet material thus provides the level of luminance needed by older drivers.

The surface from which the warning signal may be transmitted towards oncoming drivers may also be part of the stricken or broken-down vehicle. For example, the surface could take the form of a glass surface, such as the rear windscreen, which has light-emitting devices, for example light-emitting diodes, associated with it, which light-emitting devices form the warning signal when illuminated. The surface could also incorporate other surface portions of the stricken vehicle. The surface may also be a flexible sheet-like surface which transmits the warning signal by emission of light rather than reflection of light, and such a surface could be in the form of a flexible display screen, such as an OLED (Organic Light-Emitting Diode) screen, placed on an appropriate part of the stricken vehicle and which can be arranged to illuminate the warning signal and can be stored in a container when not in use. Such flexible display screens may me detachably connected to the vehicle in any suitable manner as disclosed hereinabove.

The invention claimed is:

1. A non-wrap non-digital passive warning safety device for a motor vehicle comprising a sheet of removable PVC flexible material readily detachable and connectable to an external portion of a motor vehicle, and non-magnetic attachment means for such readily detachable connectability, the sheet material being arranged to be wholly within the bounds of at least a portion of the outer surface of the vehicle when attached thereto, the sheet material having an outer surface which is at least partially reflective and including a warning text and/or pattern printed thereon, wherein the sheet material further comprises portions which comprise perforations or comprise portions of a perforated mesh, and further wherein the warning text and/or warning is non-changeable and non-removable from the material, once printed.

2. A safety device according to claim 1, wherein the outer surface has a chevron-style pattern in heavily contrasting fluorescent colours.

3. A safety device according to claim 1, wherein the sheet material is detachably connectable to a rear portion of the vehicle.

4. A safety device according to claim 1, wherein the sheet material is printed with micro-prismatic reflective material.

5. A safety device according to claim 1, and further comprising re-chargeable lights attached to the outer surface of the sheet material.

* * * * *